US006333790B1

(12) United States Patent
Kageyama

(10) Patent No.: US 6,333,790 B1
(45) Date of Patent: Dec. 25, 2001

(54) PRINTING SYSTEM WHEREIN PRINTER CONNECTED TO ONE COMPUTER IS MANAGED BY ANOTHER COMPUTER OVER A NETWORK

(75) Inventor: Seiji Kageyama, Kawasaki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 09/161,419

(22) Filed: Sep. 24, 1998

(30) Foreign Application Priority Data

Sep. 26, 1997 (JP) .................................................... 9-261981
Mar. 19, 1998 (JP) .................................................. 10-070598

(51) Int. Cl.[7] .................................................. G06F 15/00
(52) U.S. Cl. .......................................... 358/1.15; 709/200
(58) Field of Search ........................... 358/1.1, 1.9, 1.11, 358/1.12, 1.13, 1.14, 1.15, 400, 500, 442; 707/500, 522; 709/104, 105, 200, 201, 203, 205, 212, 213, 218, 220, 223, 232, 238

(56) References Cited

U.S. PATENT DOCUMENTS

| | | | |
|---|---|---|---|
| 4,947,345 | * 8/1990 | Paradise et al. | 358/442 |
| 5,050,100 | * 9/1991 | Damon et al. | 358/1.16 |
| 5,819,015 | * 10/1998 | Martin et al. | 358/1.15 |
| 5,873,659 | * 2/1999 | Edwards et al. | 400/61 |
| 6,088,120 | * 7/2000 | Shibusawa et al. | 358/1.15 |
| 6,097,498 | * 8/2000 | Debry et al. | 358/1.13 |
| 6,175,839 | * 1/2001 | Takao et al. | 707/500 |

* cited by examiner

Primary Examiner—Garcia Gabriel
(74) Attorney, Agent, or Firm—Antonelli, Terry, Stout & Kraus, LLP

(57) ABSTRACT

A printing system includes a network, a first computer connected to the network, a second computer connected to the network, and a printer connected to the network. The first computer instructs the printer to print. The printer includes a printer controller and a printer engine. The printer controller includes an individual printer management part for managing the printer, and an individual printer information DB part. The second computer includes a total printer management service processing part for managing a plurality of printers including the printer connected to the network, and a total printer management information DB part. The second computer communicates with the printer controller and/or the first computer over the network to manage the printer to cope with trouble in the printer, order consumable items and replacement parts for the printer, and update programs and data for using the printer.

7 Claims, 13 Drawing Sheets

FIG.10

| | | |
|---|---|---|
| PRINTER MANUFACTURING NUMBER | | REGISTER INFORMATION 10A |
| PRINTER INSTALLATION PLACE | | |
| PRINTER TYPE NAME | | |
| PRINTER SYSTEM CONSTRUCTION/OPTION | | |
| ⋮ | | |
| PERIOD OF USE | | PRINTER OPERATION INFORMATION 10B |
| NUMBER OF TROUBLE/FAILURE OCCURRENCES | | |
| TROUBLE/FAILURE HISTORY (TROUBLE/FAILURE CODES AND OCURRENCE TIME LIST) | | |
| ⋮ | | |
| CONSUMABLE ARTICLE 1 (A4 SIZE PAPER) | SPENT (NO. OF SHEETS) | USE INFORMATION ON EACH CONSUMABLE ARTICLE 10C |
| | REMAIN (NO. OF SHEETS) | |
| | OTHERS | |
| CONSUMABLE ARTICLE 2 (A3 SIZE PAPER) | SPENT (NO. OF SHEETS) | |
| | REMAIN (NO. OF SHEETS) | |
| | OTHERS | |
| CONSUMABLE ARTICLE 3 (TONER) | SPENT | |
| | REMAIN | |
| | OTHERS | |
| ⋮ | | |
| PART 1 (PRINTER CONTROLLER) | PRECEDING EXCHANGE TIME | OPERATION INFORMATION ON EACH PART 10D |
| | AVERAGE LIFE TIME | |
| | USE TIME | |
| | OTHERS | |
| PART 2 (FIXING UNIT) | PRECEDING EXCHANGE TIME | |
| | AVERAGE LIFE TIME | |
| | USE TIME | |
| | OTHERS | |
| ⋮ | | |
| | | OTHERS 10E |

PRINTING SYSTEM WHEREIN PRINTER CONNECTED TO ONE COMPUTER IS MANAGED BY ANOTHER COMPUTER OVER A NETWORK

BACKGROUND OF THE INVENTION

The present invention relates to a printing system for performing printing using a computer, such as a personal computer, a workstation, or the like.

In a conventional printing system, the information to be printed, which is composed by a computer, is printed by transmitting the information to a printer, and the printer then carries out the printing itself.

However, since a printer manufacturer cannot be aware at all times of the operating state of a printer being used by a user, there are the following problems in the usability of the printer.

(1) When a user wants to know how to cope with a problem in his or her printer or wants to know about an advanced method of using the printer, he or she typically needs to make an inquiry to the customer service center of the printer manufacturer by telephone, which requires the expenditure of time and money. There sometimes occurs a problem in that, when the user makes such a telephone call, the telephone lines of the printer manufacturer are busy or the user is unable to communicate with an appropriate person in the service center for inquiry concerning a particular problem.

(2) It is difficult for the user to understand all of the types of the various kinds of consumable articles (various kinds of paper, toner, and so on) available for use in a complex printer, such as a laser printer, and to properly place an order for and obtain the various kinds of consumable articles required by the printer. It is possible to employ a service man dedicated to the servicing of the printer in order to solve a particular difficulty, but the cost for the services of the service man is not insignificant, and accordingly, to provide such services, the user is subjected to an increase in the cost of maintenance of the printer and the printer manufacturer is subjected to an increase in personnel expenses.

SUMMARY OF THE INVENTION

An object of the present invention is to solve the problems discussed above and to provide a printing system having a good usability. In order to attain this object and solve the problems described above, the present invention employs the following features.

A first printing system in accordance with the present invention is characterized by a printing system which comprises a network, and a first computer, a second computer, and a printer connected to the network, wherein the first computer instructs the printer to print. The printer is composed of a printer controller and a printer engine, the printer controller having an individual printer management part for managing the printer and an individual printer information DB part; and the second computer has a total printer management service processing part for managing a plurality of printers including the printer connected to the network and a total printer management information DB part. In the operation of this system, the printer controller receives information on occurrence of trouble in the printer engine and a description of the trouble; and, based on the received information, the first computer is sent information on the occurrence of trouble in the printer engine and a description of the trouble from the printer controller. In response to the first computer inquiring as to a method of coping with the trouble indicated by the printer controller, the printer controller transmits the contents of the inquiry to the second computer. Then, the total printer management service processing part of the second computer retrieves a reply to the inquiry from the total printer management information DB part, and transmits the reply to the printer. The printer then transmits the reply to the first computer.

A second printing system in accordance with the present invention is characterized by a printing system which comprises a network, and a first computer, a second computer, and a printer connected to the network, wherein the first computer instructs the printer to print. The printer is composed of a printer controller and a printer engine, the printer controller having an individual printer management part for managing the printer and an individual printer information DB part; and the second computer has a total printer management service processing part for managing a plurality of printers including the printer connected to the network and a total printer management information DB part. In the operation of this system, the printer controller receives information concerning the status of consumable articles in the printer engine, and stores the information in the individual printer information DB part. Based on the contents of the individual printer information DB part, the first computer receives information on a shortage of consumable articles in the printer engine from the printer controller and places an order for the consumable articles to the printer controller. The printer controller transmits the contents of the order to the second computer; and the total printer management service processing part of the second computer performs processing to accept the order by making access to and writing in the total printer management information DB part. Then information on completion of the order and accompanying information is transmitted to the printer. The printer then transmits the information on completion of the order and the accompanying information to the first computer.

A third printing system in accordance with the present invention is characterized by a printing system which comprises a network, and a first computer, a second computer, and a printer connected to the network, wherein the first computer instructs the printer to print. The printer is composed of a printer controller and a printer engine, the printer controller having an individual printer management part for managing the printer and an individual printer information DB part; and the second computer has a total printer management service processing part for managing a plurality of printers including the printer connected to the network and a total printer management information DB part. In the operation of this system, the printer controller receives information concerning the operating status of the printer engine, and stores the information in the individual printer information DB part. Based on the contents of the individual printer information DB part of the printer controller, the total printer management service processing part in the second computer collects the information concerning the operating status of the printer engine; and, based on the collected information, the total printer management service processing part in the second computer proposes the replacement of a part to the printer controller. The printer controller then transmits the part replacement proposal to the first computer. Based on the transmitted part replacement proposal, the first computer issues information for ordering the replacement part to the printer controller. The printer controller transmits the received information for ordering the replacement part to the second computer. The second computer receives the information for ordering the replacement part; and the total printer management service processing part of the second computer executes processing for acceptance of the order.

The third printing system in accordance with the present invention is further characterized by the fact that the total printer management service processing part in the second computer performs acceptance processing of an order, and then transmits information on completion of acceptance of the order and accompanying information to the printer controller. The printer controller then transmits the information on completion of acceptance of the order and the accompanying information to the first computer.

A fourth printing system in accordance with the present invention is characterized by a printing system which comprises a network, and a first computer, a second computer, and a printer connected to the network, wherein the first computer instructs the printer to print. The printer is composed of a printer controller and a printer engine, an updated program and data for the printer controller being registered and stored in the second computer. In the operation of this system, the second computer transmits information for proposing updating of a program and data of the printer to the printer controller; and the printer controller transmits the proposal information to the first computer. The first computer transmits updating request information for requesting an update of the program and the data to the printer controller; and the printer controller transmits the updating request information to the second computer. The second computer reads the requested program and the requested data, and then transmits the requested program and the requested data to the printer controller. The printer controller receives and stores the program and the data, and then transmits updating completion information concerning the program and the data to the first computer. The first computer notifies a user of completion of updating by displaying updating completion information on a screen using a user interface. The user of the first computer, having been notified of the completion of updating by the updating completion information, transmits a document to the printer; and the printer then performs printing of the document using the updated program and the updated data.

A fifth printing system in accordance with the present invention is characterized by a printing system which comprises a network, and a first computer, a second computer, and a printer connected to the network, wherein the first computer instructs the printer to print. The printer is composed of a printer controller and a printer engine, an updated program and updated data for the first computer being registered and stored in the second computer. In the operation of this system, the second computer transmits information for proposing updating of a program and data for the first computer to the printer controller. The printer controller then transmits the proposal information to the first computer. The first computer then transmits updating request information for requesting an update of the program and the data for the first computer to the printer controller; and the printer controller transmits the updating request information to the second computer. The second computer reads the requested program and the requested data, and then transmits the requested program and the requested data to the printer controller. The printer controller receives and stores the program and the data, and transmits the program and the data to the first computer. The first computer receives and stores the program and the data for the first computer and then notifies a user of completion of updating by displaying updating completion information on a screen using a user interface. The user of the first computer, having been notified of the completion of updating by the updating completion information, instructs the printer to print using the updated program and the updated data.

A sixth printing system in accordance with the present invention is characterized by a printing system which comprises a network, and a first computer, a second computer, and a printer connected to the network, wherein the first computer instructs the printer to print. The printer is composed of a printer controller and a printer engine, an updated program and data for the first computer being registered and stored in the second computer. In the operation of this system, the second computer transmits information for proposing updating of a program and data for the first computer to the first computer; and the first computer transmits updating request information for requesting an update of the program and the data for the first computer to the second computer. The second computer reads the requested program and the requested data, and then transmits the requested program and the requested data to the first computer. The first computer receives and stores the program and the data for the first computer and then notifies a user of completion of updating by displaying updating completion information on a screen using a user interface. The user of the first computer, having been notified of the completion of updating by the updating completion information, instructs the printer to print using the updated program and the updated data.

BRIEF DESCRIPTION OF THE DRAWINGS

FIG. 10 is a diagram for explaining the individual printer information DB part in accordance with the present invention.

DETAILED DESCRIPTION OF THE INVENTION

Various embodiments of the present invention will be described in detail below.

Figure 1:
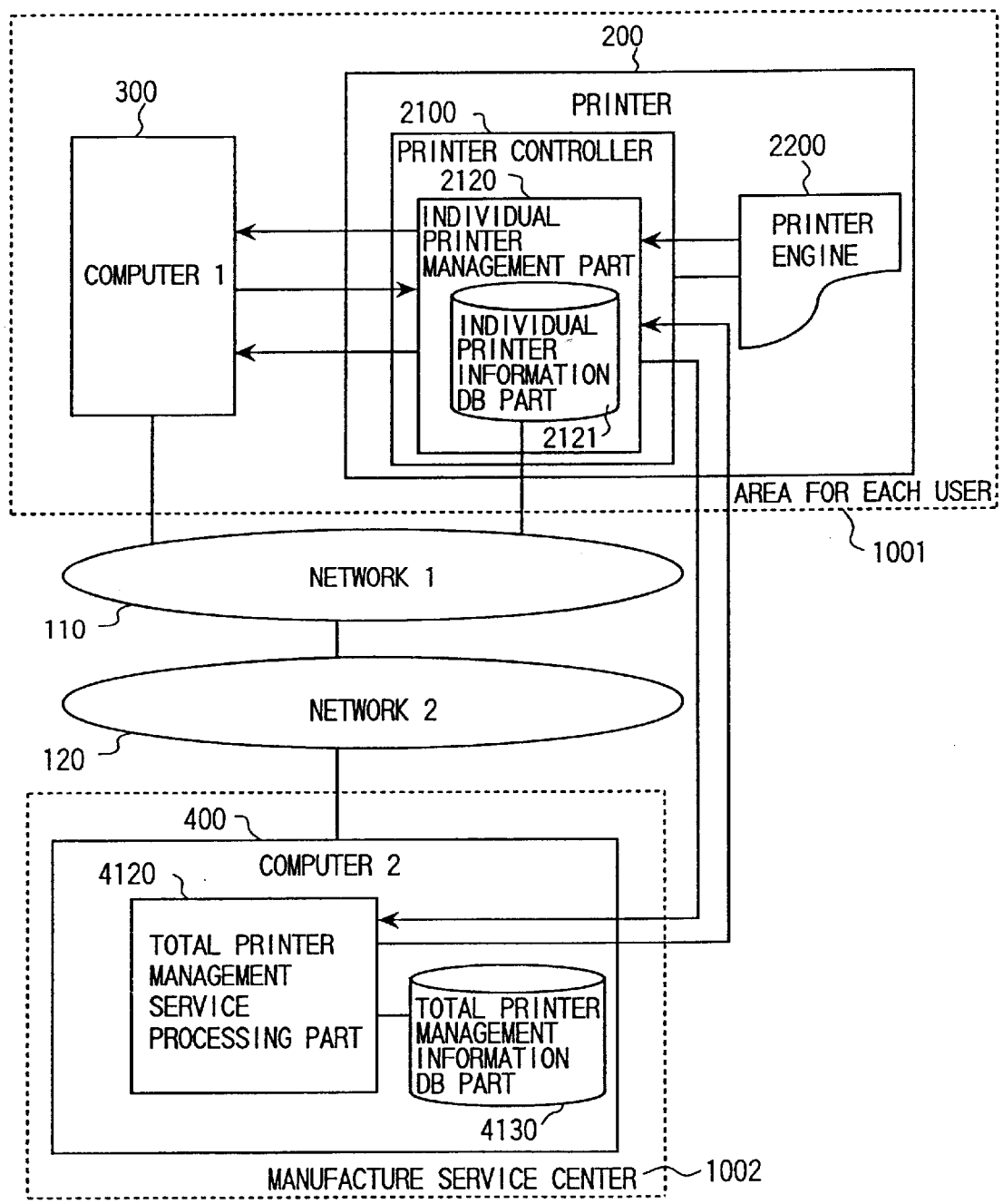
FIG. 1 is a block diagram of a printing system in accordance with the present invention.

Initially, the overall construction of the printing system will be described, referring to FIG. 1.

The printing system is composed of a first network 110, a second network 120, a first computer 300, and a printer 200 connected to the first network 110, and a second computer 400 connected to the second network 120.

It is assumed that the first network 110 is installed in an area usable for each user (hereinafter referred to as an area for each user 1001) where the printer 200 is used, and the second network 120 is installed in a service center of a manufacturer of the printer 200 (hereinafter referred to as a manufacturer service center 1002). Further, although each user or each company of users has a plurality of systems composed of the first network 110 and the first computer 300 and the printer 200, only one of the systems is shown in FIG. 1 for making it easy to understand the user environment, but this is not a necessary condition for the present invention.

The first network 110 and the second network 120 are connected to each other using inter-network mutual connection technology (router or internet/intranet technology), so that the machines (computers and printers) connected to the first network 110 and the second network 120 can mutually communicate with each other. However, in order to make the system simpler, the first network 110 and the second network 120 may be constructed as one network.

Figure 3:
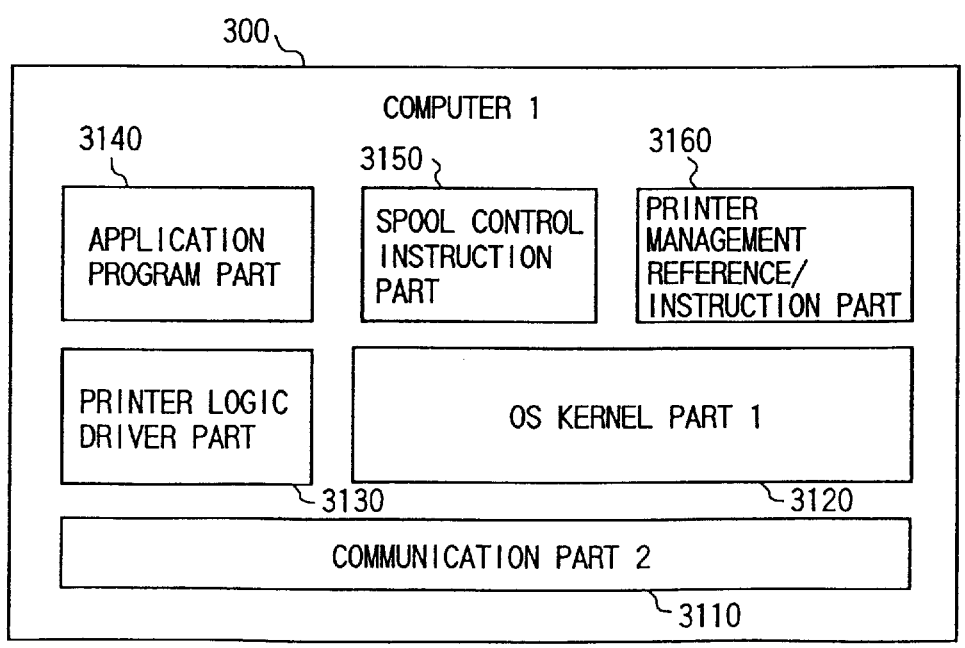
FIG. 3 is a block diagram for explaining a software method of a first computer in accordance with the present invention.

The first computer 300 instructs the printer 200 to print a document composed by an application program 3140 using a printer logic driver 3130, which is to be described later in conjunction with FIG. 3.

The printer 200 has a printer controller 2100 and a printer engine 2200, and the printer controller has an individual printer management part 2120 and an individual printer information DB part 2121 in order to manage the printer. The construction of the printer 200 will be described in detail later with reference to FIG. 2.

The second computer 400 has a total printer management service processing part 4120 and a total printer management information DB part 4130 in order to manage a plurality of printers including the printer 200. The construction of the second computer 400 will be described in detail later with reference to FIG. 4.

The construction of the printer will now be described in detail, referring to FIG. 2.

As described above, the printer 200 has the printer controller 2100 and the printer engine 2200, and the printer controller has the individual printer management part 2120 and the individual printer information DB part 2121 in order to manage the printer. The individual printer information DB part 2121 stores the information shown in FIG. 10 as an operating status of the printer engine 2200.

As shown in FIG. 10, register information 10A, printer operation information 10B, use information on each consumable article 10C, operation information on each part 10D, and other information 10E in regard to the printer 200 are stored in the DB part 2121. Each item of information 10A, 10B, 10C, 10D, and 10E is constructed as described in FIG. 10. In a case where the printer engine is of an electrophotographic type using a laser optical system, paper (on a size-by-size basis), toner, the photosensitive drum, cleaner, and so on are managed as consumable articles, and the printer controller, optical system parts (semiconductor laser, polygon mirror and so on), the fixing unit, and so on are managed as replaceable parts.

The individual printer management part 2120 manages the printing status of the printer engine 2200 while making access to the contents of the individual printer information DB part 2121. The individual printer management part 2120 performs referring, writing/updating, retrieving, and the like operations as an access.

Figure 2:
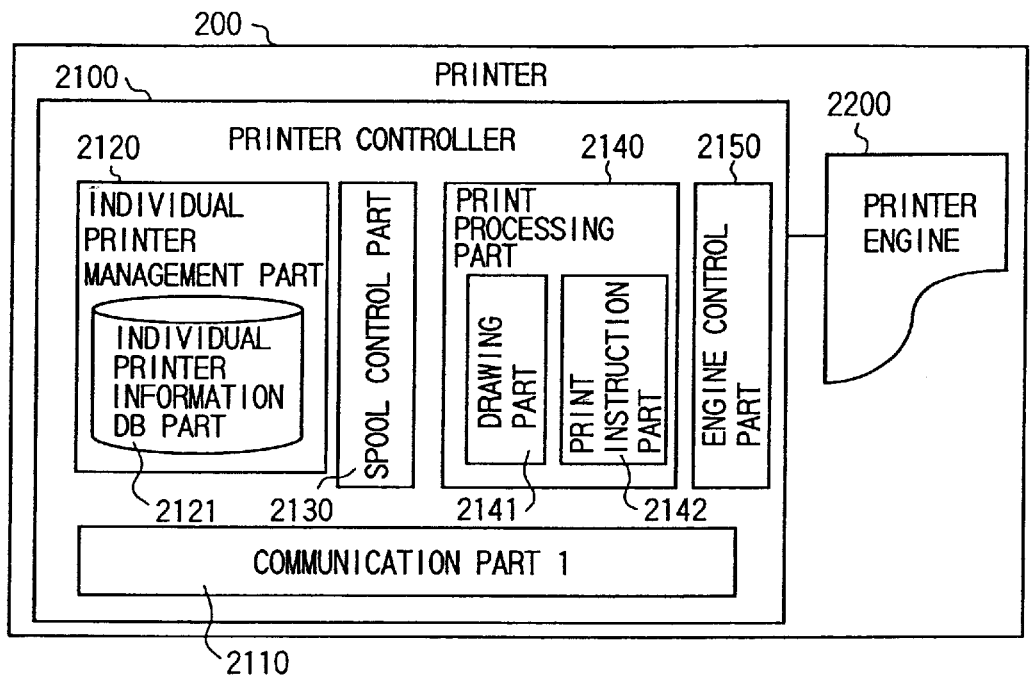
FIG. 2 is a block diagram for explaining a software method of a printer in accordance with the present invention.

Further, as shown in FIG. 2, the printer controller 2100 has a first communication part 2110, a spool control part 2130, a print processing part 2140, and an engine control part 2150. The print processing part 2140 has a drawing part 2141 and a print instruction part 2142.

The first communication part 2110 is composed of hardware and software with which the printer 200 communicates with the various machines (computer, printer, and the like) on the first network 110 and on the second network 120 through the first network 110.

The spool control part 2130 receives and stores a print instruction for a document composed by the first computer 300 as a job, and sequentially outputs it to the print processing part 2140. The spool control part 2130 can store a plurality of jobs together. Further, it is possible to instruct the spool control part 2130 to perform a state reference, such as a print waiting order, presence or absence of occurrence of trouble and the identification thereof, and so on, and spool control, such as a change in sequential order, a deleting operation, and so on from the first computer 300 or the printer controller 2100.

The print processing part 2140 receives jobs from the spool control part 2130 one by one, and outputs them to the engine control part 2150 after a series of jobs is performed by the drawing part 2141 and the print instruction part 2142. The spool control part 2130 receives a job for a document in the form of a print command sequence and page description language which the printer 200 can accept and print, and the job is transmitted to the drawing part 2141. The described contents are constructed of different kinds of media, such as text, image, graphics, and the like. After translating the received job according to the document description, the drawing part 2141 expands the document description into dots, and converts them into bit map data to be written in a memory called a page buffer memory (not shown). The print instruction part 2142 instructs the engine control part 2150 to print the contents of the page buffer memory using the printer engine 2200. The engine control part 2150 sequentially outputs the contents of the page buffer memory to the printer engine 2200, and the printer engine 2200 physically prints the contents onto a sheet of paper using a printer mechanism. As to the operation of the printer mechanism, there are various printing method, such as a photographic method using a laser optical system, a photographic method using an LED, a photographic method using a liquid crystal shutter, an ink jet method, a shuttle type impact method, and so on.

The construction of the first computer 300 will now be described in detail, referring to FIG. 3.

The first computer 300 is composed of a second communication part 3110, a first OS kernel part 3120, a printer logic driver 3130, an application program part 3140, a spool control instruction part 3150, and a printer management reference/instruction part 3160.

The second communication part 3110 is composed of hardware and software with which the first computer 300 communicates with the various machines (computer, printer, and the like) on the first network 110 and on the second network 120 through the first network 110.

The first OS kernel part 3120 is basic software (also called an operating system) for controlling the hardware, the user interface, and so on composing the first computer 300. The second communication part 3110 can be regarded as a part of the first OS kernel part 3120, but is described as a different element in order to provide a clearer description.

The application program part 3140 is composed of programs, such as a word processing program, a table-calculation program, a graphics program, and so on, which are used to form a document and produce an instruction to print the formed document using the printer 200.

The printer logic driver part 3130 converts the document formed in the application program part 3140 into a document in the form of a print command sequence and page description language which the printer 200 can accept and print, and transmits the converted document to the printer 200 through the first OS kernel part 3120 and the second communication part 3110.

The spool control instruction part 3150 is, as described above, used in the first computer 300 to instruct the spool control part 2130 in the printer 200 to perform a state reference, such as print waiting order, presence or absence of occurrence of trouble and the identification thereof, and so on, and spool control, such as a change in the sequential order, a deleting operation, and so on.

The printer management reference/instruction part 3160 is used in the first computer 300 to instruct the individual printer management part 2120 to refer to the contents of the individual printer information DB part 2121 and to perform printer management processing.

Figure 4:
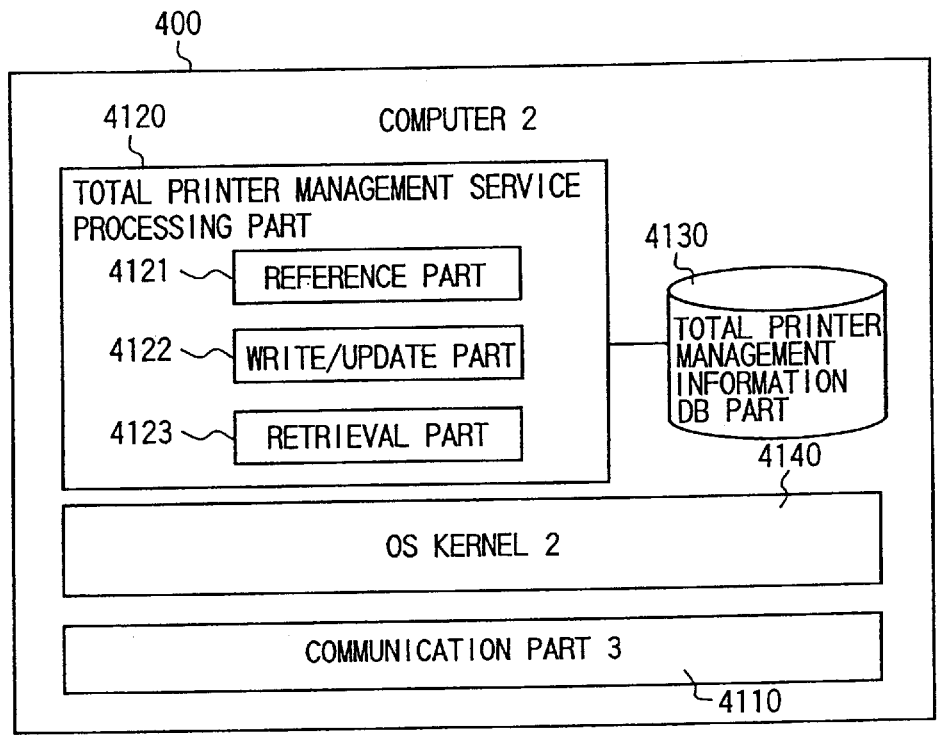
FIG. 4 is a block diagram for explaining a software method of a second computer in accordance with the present invention.

The construction of the second computer 400 will now be described in detail, referring to FIG. 4.

The second computer 400 is composed of a third communication part 4110, a second OS kernel part 4140, a total printer management service processing part 4120, and a total printer management information DB part 4130.

The third communication part 4110 is composed of hardware and software with which the second computer 400 communicates with the various machines (computer, printer, and the like) on the second network 120 and on the first network 110 through the second network 120.

The second OS kernel part 4140 is basic software (also called an operating system) for controlling the hardware, the user interface, and so on composing the second computer 400. The third communication part 4110 can be regarded as a part of the second OS kernel part 4140, but is described as a different element in order to provide a clearer description.

The total printer management information DB part 4130 is a part in which the manufacturer of the printer 200 concentratively stores operation status information for the printers sold by the manufacturer as part of the service center of the manufacturer.

Figure 11:
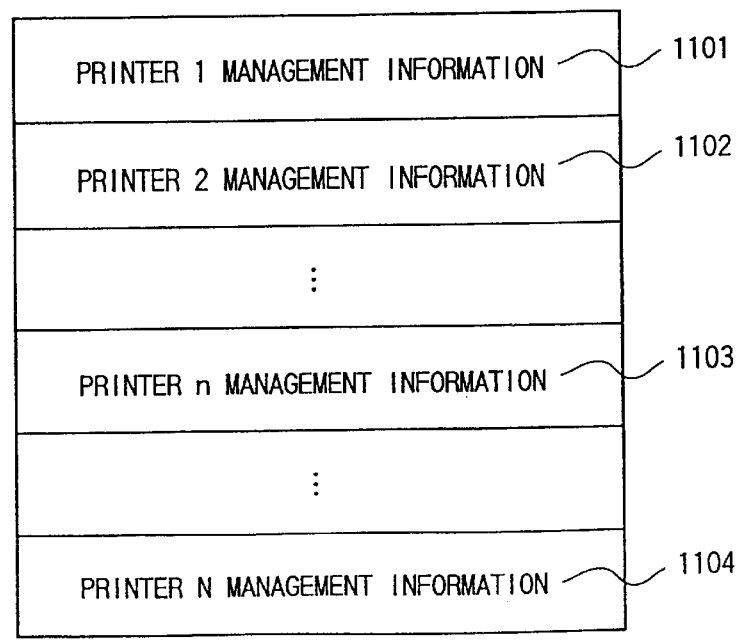
FIG. 11 is a diagram for explaining the total printer information DB part in accordance with the present invention.
Figure 12:
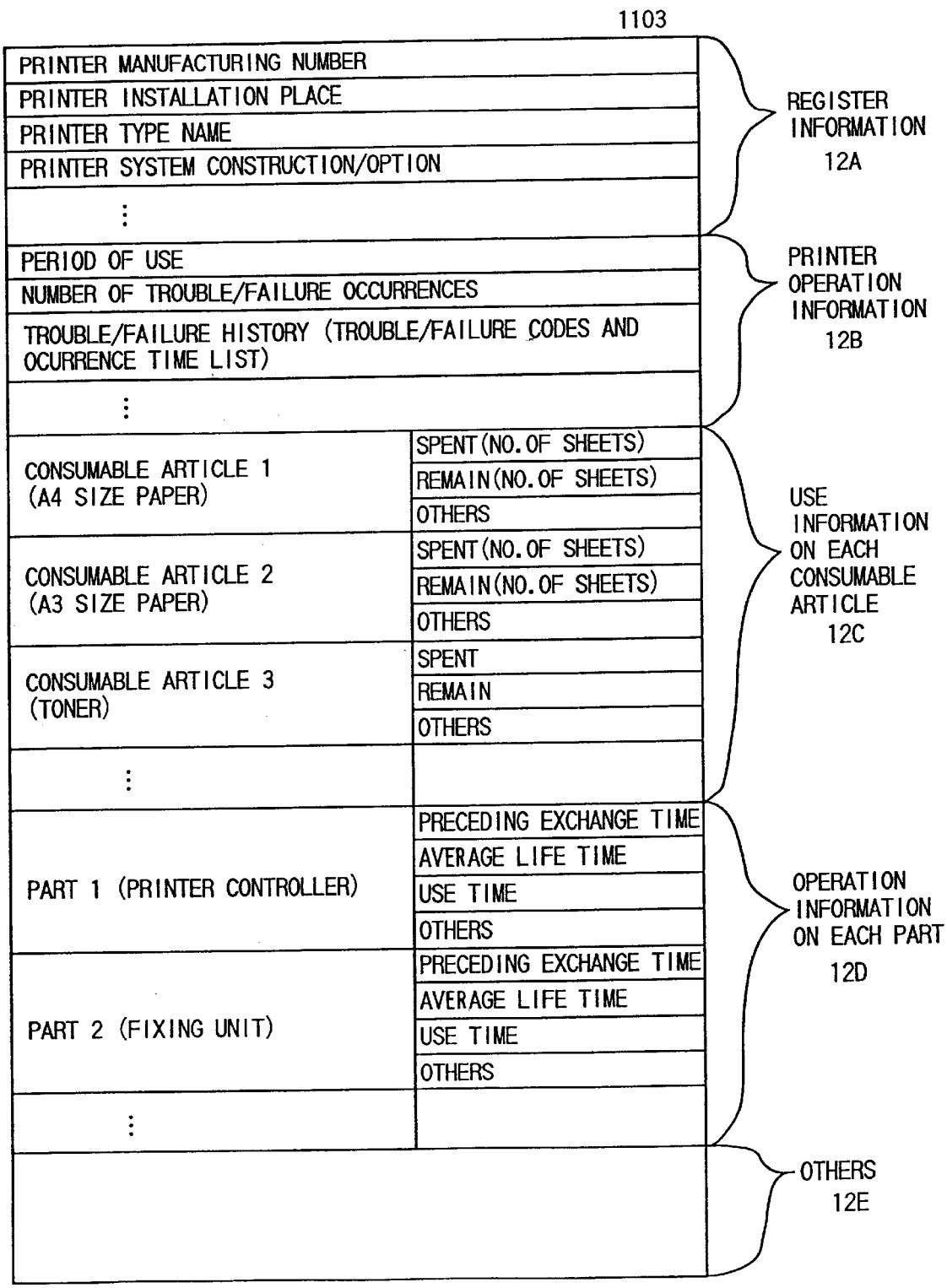
FIG. 12 is a diagram for explaining the total printer information DB part in accordance with the present invention.

In the total printer management information DB part 4130, the contents shown in FIG. 11 and FIG. 12 are stored. As shown in FIG. 11, the total printer management information DB part 4130 stores management information for all printers managed by the second computer 400, that is, printer 1 management information 1101, printer 2 management information 1102, . . . , printer n management information 1103, . . . , printer N management information 1104. In regard to, for example, the printer n management information 1103, as shown in FIG. 12, register information 12A, printer operation information 12B, use information on each consumable article 12C, operation information on each part 12D, and other information 12E in regard to the printer n are stored. Each item of the information 12A, 12B, 12C, 12D, and 12E is constructed as the contents described in FIG. 12. In a case where the printer engine is of an electrophotographic type, using a laser optical system, paper (on a size-by-size basis), toner, the photosensitive drum, cleaner, and so on are managed as consumable articles, and the printer controller, optical system parts (semiconductor laser, polygon mirror and so on), the fixing unit, and so on are managed as replaceable parts.

The total printer management service processing part 4120 manages the printing statuses of the plurality of printers sold by the manufacturer while making access to the total printer management DB part 4130. The total printer management service processing part 4120 includes a reference part 4121, a write/update part 4122, a retrieval part 4123, and so on, and performs referring, writing/updating, and retrieving operations relative to the total printer management DB part 4130 using each of the reference part 4121, the write/update part 4122, and the retrieval part 4123.

The hardware construction of the machines which make up the printing system will now be described, referring to FIG. 5 and FIG. 6.

Each of the first computer 300 and the second computer 400 is an apparatus which is composed of an MPU 500, a system bus 501, a ROM memory 510, a RAM memory 511, a keyboard 521, a mouse 522, a disk controller 531, a secondary memory unit 532, a display controller 541, a display 542, a network controller 550, and a printer adapter 560.

The system bus 501 carries various kinds of input and output signals (address signals, data signals, and other control signals) of the MPU 500. The MPU 500 performs input and output operations with reference to the peripheral devices, such as the keyboard 521, the secondary memory unit 532, the display 542, the network 110, and so on, and with memories, such as the ROM memory 510, the RAM memory 511, and so on. The keyboard 521 is an input device composed of a plurality of input keys, and has the mouse 522 as a kind of pointing device connected thereto. The secondary memory unit 532 is connected to the system bus 501 through the disk controller 531, and the display 542 is connected to the system bus 501 through the display controller 541. The system bus of this apparatus is further connected to the network 110, such as a LAN or a WAN, through the network controller 550, and connected to a printer through the printer adapter 560 and a cable.

The hardware of the printer 200 will now be described, referring to FIG. 6.

The printer 200 is composed of the printer controller 2100 and the printer engine 2200. The printer controller 2100 is composed of an MPU bus 601, an I/F part 602, an MPU 603, a ROM memory 604, a secondary memory unit 605, a user operating panel 607, a sub-MPU 606, a printer memory controller 609, and a RAM memory 60A.

The MPU bus 601 carries various kinds of input and output signals (address signals, data signals, and other control signals) of the MPU 603. The MPU 603 performs input and output operations relative to the peripheral controllers such as 602, 606, 609 and the memory devices such as 604, 60A, 605 through the MPU bus 601.

The interface part 602 (hereinafter, interface is abbreviated as I/F) is a controller for effecting communication by the printer with the various kinds of machines via a cable, such as the first computer 300, the second computer 400, and so on. Physical I/Fs usable as the I/F part 602 are Ethernet, Token-Ring, FDDI (fiber distributed data interface), ATM (asynchronous transfer mode), and ISDN (integrated services digital network), and hardware logic appropriate for the I/F part 602 is installed depending on the physical I/F used.

The ROM memory 604 stores an initial boot-up program (also called an IPL (initial program loading) program) for the printer controller 2100 and part of a character font.

The RAM memory 60A stores (a) a printer controller control program, (b) the remainder of the character font, (c) a command buffer memory, (d) a page buffer memory, and (e) various kinds of management tables, such as a page buffer management table and a printer management table, and others. Among these, the programs (a) and (b) are stored by downloading from any one of the computers 300 or 400 using the IPL program described above. It is possible that the programs (a) and (b) are not stored in the RAM memory 60A, but are stored in the ROM memory 604 in advance. On the other hand, the character font need not be stored in the ROM memory 604 at all, since all of the character font may be stored in the RAM memory 60A.

The sub-MPU 606 performs input and output processing with the user operating panel 607 or the printer engine 2200 according to an instruction from the MPU 603.

The printer memory controller 609 performs read-out processing with respect to the contents of the RAM memory 60A (normally contents of the page buffer part) to the printer engine 2200, and performs DRAM memory control (refresh) when the RAM memory 60A is a DRAM. The read-out processing is performed using an installed DMA (direct memory access) function. At the time when read-out of a one-page volume of data from the page buffer part is completed, the printer memory controller 609 asserts an interruption signal (one of the signals on the MPU bus 601) to the MPU 603 to start interruption processing for termination of a page buffer read-out operation by the MPU 603.

The printer controller 2100 communicates with the printer engine 2200 using the sub-MPU 606 through a signal line 600C-1, and using the printer memory controller 609 through a signal line 600C-2 according to an I/F, called a printer engine I/F.

In a case where the printer engine is a shuttle printer, the printer memory controller 609 performs format transformation of the contents of the page buffer, and then outputs the transformed contents to the printer engine using the signal line 600C-2. In a case where the printer engine is a laser printer, the printer memory controller 609 performs parallel-serial transformation of the contents of the page buffer, and then outputs the transformed contents to the printer engine using the signal line 600C-1.

In a case where the printer engine is a shuttle printer, the signal line 600C-1 is used to receive signals for indicating a first position on a page from the printer engine. In a case where the printer engine is a laser printer, the signal line 600C-1 is used by the sub-MPU 606 to transmit a command for inquiring or instructing to the printer engine 2200 and to transmit a command for receiving a reply status from the printer engine, and status transmitting and receiving signals, and a control signal for controlling the procedure for reading the contents of the page buffer to the printer engine. It is possible to omit the sub-MPU 606 and allow the MPU 603 to perform the processing function of the sub-MPU 606.

The above-described system is common to all the following embodiments.

Figure 7:
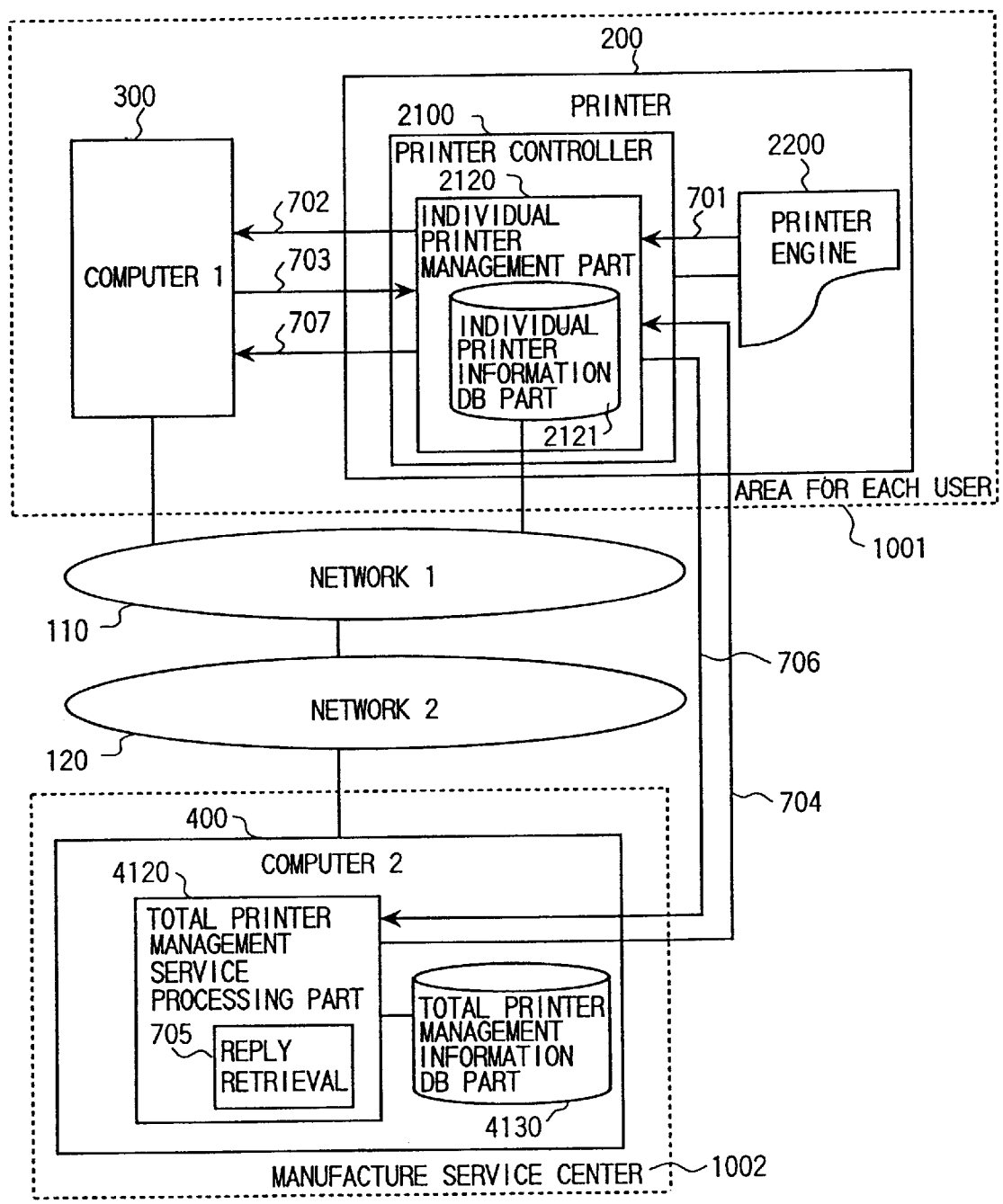
FIG. 7 is a block diagram for explaining a first embodiment of a processing procedure in accordance with the present invention.

A first embodiment of the processing procedure according to the invention will now be described, referring to FIG. 7.

Initially, the printer engine 2200 detects the occurrence of trouble. Examples of the troubles considered are shortage of consumable articles, such as paper, toner, and so on, a paper jam, an open door, a loss of printer power, a failure in the fixing unit, a failure in the optical system, a failure in the printing system, and so on.

The printer controller 2120 receives information on the occurrence of trouble in the printer engine 2200 and the contents thereof (process 701). As the receiving method, there are a method in which the printer engine 2200 actively reports to the printer controller 2100 and a method in which the printer controller 2100 periodically monitors the status of the printer engine 2200. Either of the methods may be employed, or both of them may be used together.

Then, the first computer 300 receives information on the occurrence of trouble in the printer engine 2200 and the identification of the trouble from the printer controller 2100 (process 702). As the receiving method, there are a method in which the printer controller 2100 actively reports to the first computer 300 and a method in which the first computer 300 periodically monitors the status of the printer controller 2100. Either of the methods may be employed, or both of them may be used together.

Then, the first computer 300 issues an inquiry to the printer controller 2100 as to a method of coping with the trouble (process 703). The inquiry is issued using the user interface of the first computer 300 when the first computer 300 is informed of the occurrence of the trouble.

After that, the printer controller 2100 transmits the contents of the inquiry to the second computer 400 (process 706). The action of the process 706 is called inquiry forwarding. It also may be referred to as an agent inquiry.

Next, the total printer management service processing part 4120 of the second computer 400 obtains a reply to the inquiry by retrieving and referring to the contents of the total printer management information DB part 4130 (process 705). Then, the total printer management service processing part 4120 transmits the reply to the printer controller 2100 in the printer 200 (process 704). The action of the process 704 is called replying. It is also known as an agent reply.

Then, the printer controller 2100 forwards the received reply to the first computer 300 (process 707). The action of the process 707 is called reply forwarding. It also may be referred to as a formal reply. The first computer 300 displays the reply on a screen using the user interface to show the reply to the inquiry to the user which has issued the inquiry.

In the above description, the user makes an inquiry as to a method of coping with the printer trouble using the first computer 300, but another kind of inquiry can be used similarly to obtain a reply. For example, in a case of a highly functional printer having a scanner function, a FAX transmitting and receiving function, a multi-paper supplier, a multi-paper discharger, and so on, it is possible to make an inquiry on a method of using the printer and obtain a reply to the inquiry. As an example of the multi-paper discharger, inquiries can be made concerning a multi-sorter, a mail box, or the like.

According to the first embodiment, when a user wants to know about a method of coping with printer trouble or an advanced method of using a printer, the user can automatically access the data base in a service center of the printer manufacturer and obtain a reply to the inquiry on the computer simply by sending an inquiry to a printer at hand through the computer at hand usually used by the user. Therefore, a problem in the conventional technology can be solved and the usability of the printer can be improved.

Figure 8:
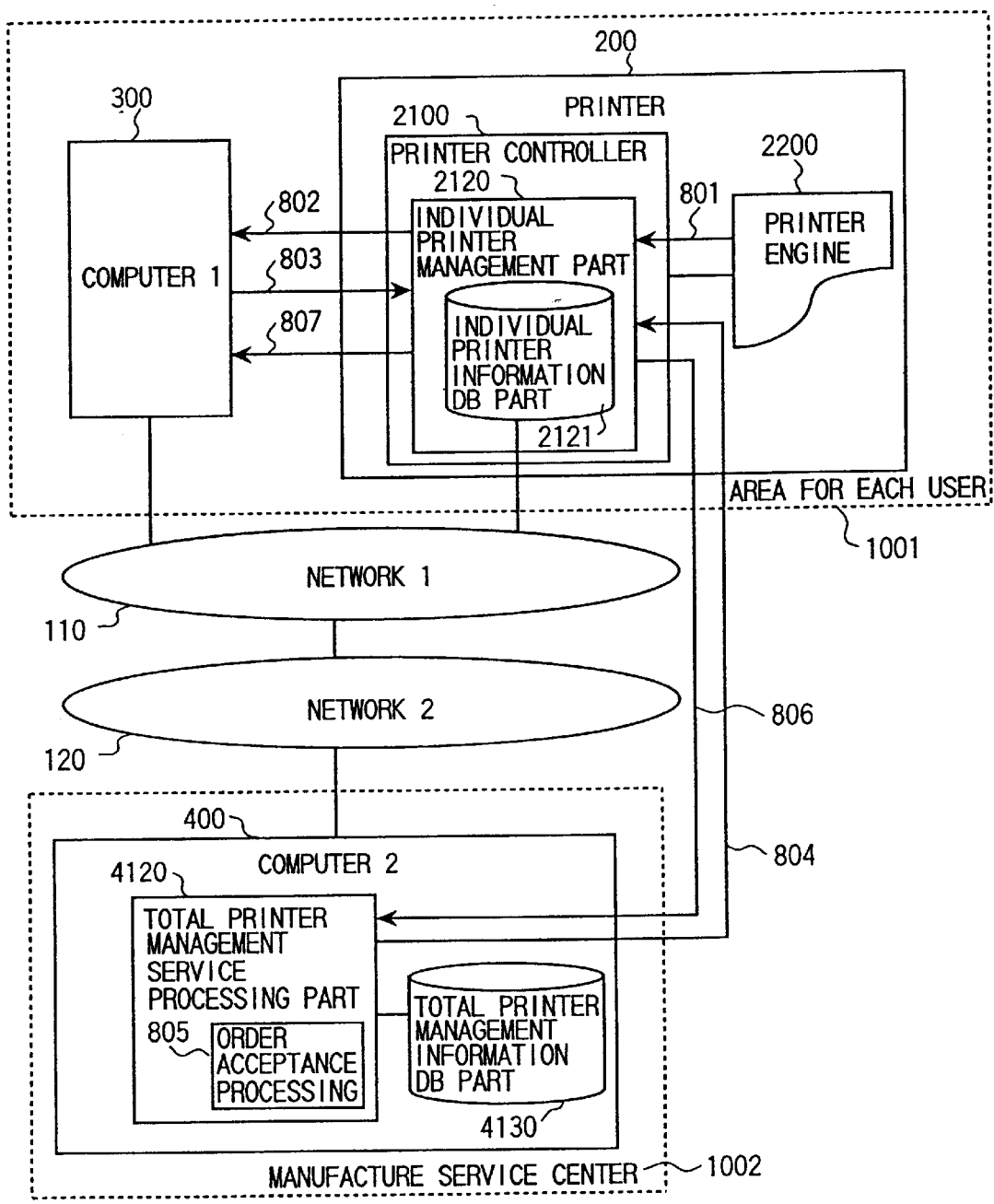
FIG. 8 is a block diagram for explaining a second embodiment of a processing procedure in accordance with the present invention.

A second embodiment of the processing procedure according to the invention will now be described, referring to FIG. 8.

The printer engine 2200 monitors and stores the status of consumable articles used in printing while performing printing processing. In a case where the printer mechanism is of an electrophotographic type, the consumable articles are paper, toner, the photosensitive drum, cleaner, and so on. In a case where the printer mechanism is of an ink jet type, the consumable articles are paper and ink. In a case where the printer mechanism is of the shuttle impact type, the consumable articles are paper and a ribbon.

The printer controller 2100 receives a signal indicating the status of consumable articles in the printer engine, and stores the status of consumable articles in the individual printer information DB part (process 801). As the receiving method, there are a method in which the printer engine 2200 actively reports to the printer controller 2100 and a method in which the printer controller 2100 periodically monitors the status of the printer engine 2200. Either of the methods may be employed, or both of them may be used together.

Then, based on the contents of the individual printer information DB part 2121 in the printer controller 2100, the first computer 300 receives information indicating a shortage of consumable articles in the printer engine 2200 from the printer controller 2100 (process 802). As the receiving method, there are a method in which the printer controller 2100 actively reports to the first computer 300 and a method in which the first computer 300 periodically monitors the status of the printer controller 2100. Either of the methods may be employed, or both of them may be used together.

Then, the first computer 300 places an order for the consumable articles which are in short supply to the printer controller 2100 (process 803). The order is placed using the user interface of the first computer 300 when the first computer 300 is informed of the shortage of the consumable articles.

Then, the printer controller 2100 forwards the order to the second computer 400 (process 806).

Then, the total printer management service processing part 4120 in the second computer 400 performs processing to accept the order by making access to the total printer management information DB part 4130 to write the order in the total printer management information DB part 4130 (process 805).

Then, the total printer management service processing part 4120 transmits information on the completion of acceptance of the order and the accompanying information to the printer controller 2100 in the printer 200 (process 804). As the accompanying information, the article name, price, appointed date of delivery, and so on are described.

After that, the printer controller 2100 forwards the information on the completion of acceptance of the order and the accompanying information to the first computer 300 (process 807). The first computer 300 displays the information on the completion of acceptance of the order and the accompanying information on a screen of a display to notify the user placing the order concerning the received information.

In the above description, the user places the order for the consumable articles to the first computer 300, but other kinds of orders and requests can be made. For example, it is possible to make a request to replace an article which is in trouble or is almost reaching the end of its lifetime. Parts which need to be replaced are the printer controller, optical system parts, the fixing unit, and so on.

According to the second embodiment, even if the user does not understand the status of use of various kinds of consumable articles for a complex printer represented by a laser printer, the printing system automatically understands the status of use of various kinds of consumable articles and the user can place an order based on such information to the service center of the printer manufacturer. Therefore, a problem in the conventional technology can be solved and the usability of the printer can be improved. Since there is no need to dispatch a service man dedicated to the printer from the printer manufacturer to the place of the user for this purpose, it is possible for the user to reduce the cost of maintenance, and for the printer manufacturer to reduce personnel expenses.

Figure 9:
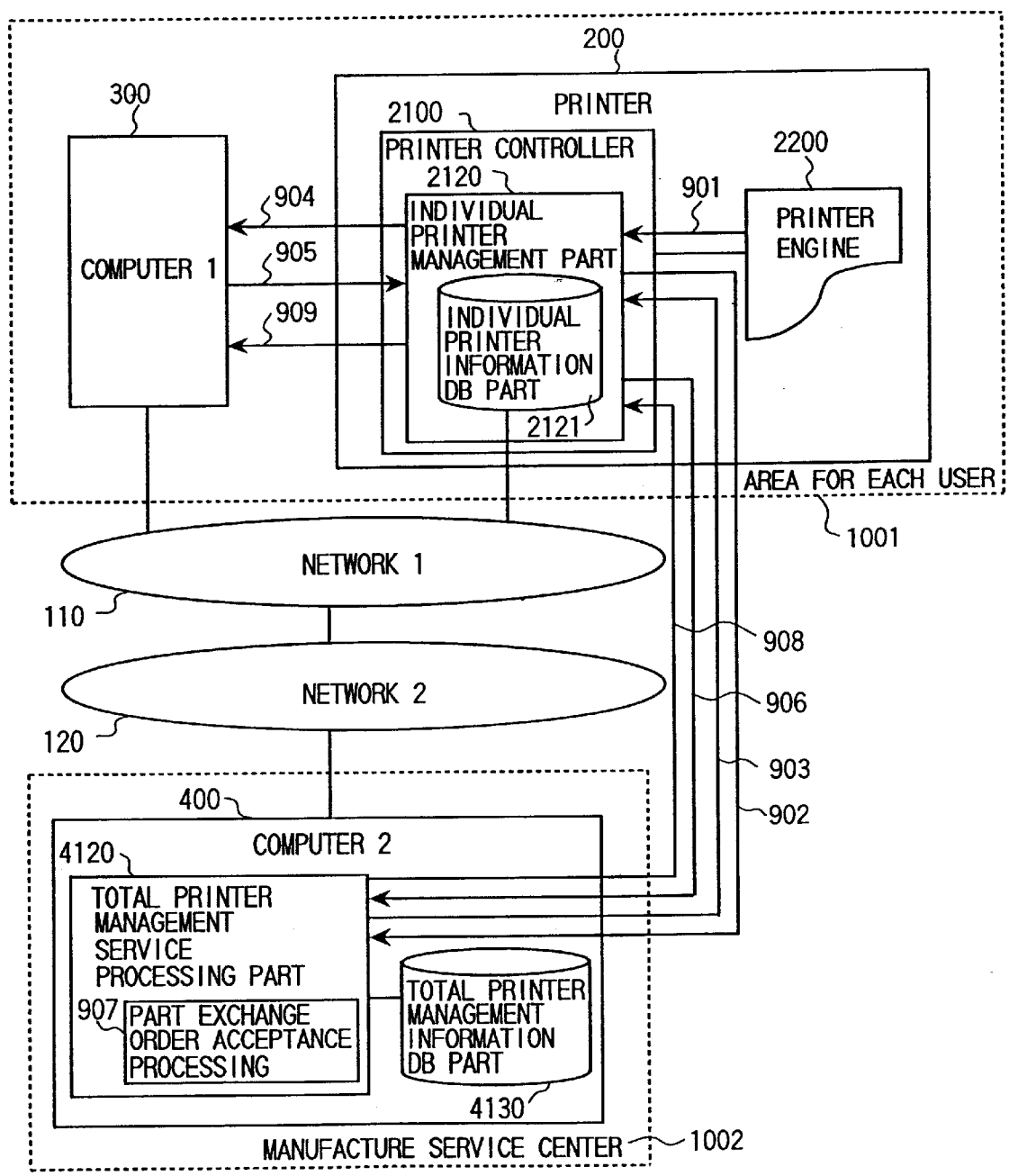
FIG. 9 is a block diagram for explaining a third embodiment of a processing procedure in accordance with the present invention.

A third embodiment of the processing procedure according to the invention will now be described, referring to FIG. 9.

The printer engine 2200 monitors and stores the operating status of printing while performing printing processing. In regard to the operating status, the period of use, the spent quantity, the remaining quantity, and the occurrence of a shortage in each of the consumable articles, the preceding exchanged time, average lifetime, period of use, number of occurrence of troubles and failures, history of occurrence of troubles and failures, and so on are monitored. These conditions relate to the contents shown in FIG. 10.

The printer controller 2100 receives information on the operating status (hereinafter, referred to simply as operating status information) of the printer engine 2200, and stores the information in the individual printer information DB part (process 901). The contents stored are the information 10A, 10B, 10C, 10D, 10E of FIG. 10. As the receiving method, there are a method in which the printer engine 2200 actively reports to the printer controller 2100 and a method in which the printer controller 2100 periodically monitors the status of the printer engine 2200. Either of the methods may be employed, or both of them may be used together.

Then, based on the contents of the individual printer information DB part 2121 in the printer controller 2100, the second computer 400 receives the operating status information in the printer from the printer controller 2100 (process 902). As the receiving method, there are a method in which the printer controller 2100 actively reports to the second computer 400 and a method in which the second computer 400 periodically monitors the status of the printer controller 2100. Either of the methods may be employed, or both of them may be used together.

Then, the second computer 400 proposes replacement of a part which is in need of replacement to the printer controller 2100 (process 903). The proposal is made using the user interface of the second computer 400, by a person responsible for user service at the printer manufacturer who knows the replacement time of the part, using the second computer 400.

The printer controller 2100 forwards the contents of the proposal to the first computer 300 (process 904).

Then, the first computer 300 transmits information concerning an order for the replacement part to the printer controller 2100 in order to place an order for the part which is in its replacement time (process 905). The order is placed at the time when the user of the first computer 300 finds the proposal information corresponding to the information of the process 904 on a screen of the first computer 300 or the like. Then, the printer controller 2100 forwards the contents of the order to the second computer 400 (process 906).

Then, the total printer management service processing part 4120 in the second computer 400 performs processing to accept the order by making access to the total printer management information DB part 4130 to write the order in the total printer management information DB part 4130 (process 907). Then, the total printer management service processing part 4120 transmits information on completion of acceptance of the order and the accompanying information to the printer controller 2100 in the printer 200 (process 908). The accompanying information includes the name of the article, the price, the appointed date of delivery, and so on.

After that, the printer controller 2100 forwards the information on the completion of acceptance of the order and the accompanying information to the first computer 300 (process 909). The first computer 300 displays the information on the completion of acceptance of the order and the accompanying information on a screen of the display using the user interface to notify the user placing the order concerning the received information.

The same result can be obtained even if the above procedure is changed as follows.

(1) Although the second computer 400 proposes the replacement of a part to the user of the first computer 300 through the printer controller 2100 in this embodiment, the second computer 400 may send the proposal for replacement of the part directly to the user of the first computer 300.

(2) By eliminating the processes after the process 903, the part may be replaced simply by having a service man of the printer manufacturer come to the place of the user where the printer 200 is installed to voluntarily replace the part.

According to the third embodiment, even if the user does not understand the status of use and the operating status of various kinds of parts which periodically need replacing in a complex printer represented by a laser printer, the printing system automatically understands the status of use and so an order can be placed to the service center of the printer manufacturer based on such information. Therefore, a problem in the conventional technology can be solved and the usability of the printer can be improved. Since there is no need to dispatch a service man dedicated to servicing the printer from the printer manufacturer to the place of the user, it is possible for the user to reduce the maintenance cost, and for the printer manufacture to reduce the personnel expenses.

A fourth embodiment of the processing procedure according to the invention will now be described, referring to FIG. 13 and FIG. 2, FIG. 3, FIG. 5, FIG. 6, and FIG. 14.

It is assumed that the printer manufacturer has updated programs and data for the printer controller used in the printer 200. For example, programs for the printer controller may have been updated to improve printing performance of the printer controller, and/or to add or change a printing function (color printing function, middle tone printing function, or compressed image data printing function) of the printer controller. Further, as the data for the printer controller, a solid black pattern, a line pattern, font data, and so on may have been added or changed. In such a case, the printer manufacturer registers and stores updated programs and updated data in the second computer 400 which manages all of the printers of the manufacturer (process 1301).

Then, the second computer 400 transmits information for proposing updating of the programs and the data for the printer 200 to the printer controller 2100 (process 1302). The information includes an explanation of the contents of the updating and a recommendation for accepting the updating, and a method of requesting the updating. Most of the programs and data for the printer 200 are programs and data for the printer controller 2100. Although the following descriptions are limited to cases of programs and data for the printer controller, the same result can be attained in a case of programs and data for the printer engine 2200. Then, the printer controller 2100 transmits the contents of the proposal to the first computer 300 (process 1303).

Then, the first computer 300 transmits information concerning the request for updating to the printer controller 2100 in order to request updating of the programs and the data (process 1304). The request is made at the time when the user of the first computer 300 finds the information concerning the proposed updating corresponding to the information of the process 1303 on a screen of the first computer 300 or the like. Then, the printer controller 2100 forwards the contents of the request to the second computer 400 (process 1305).

Figure 13:
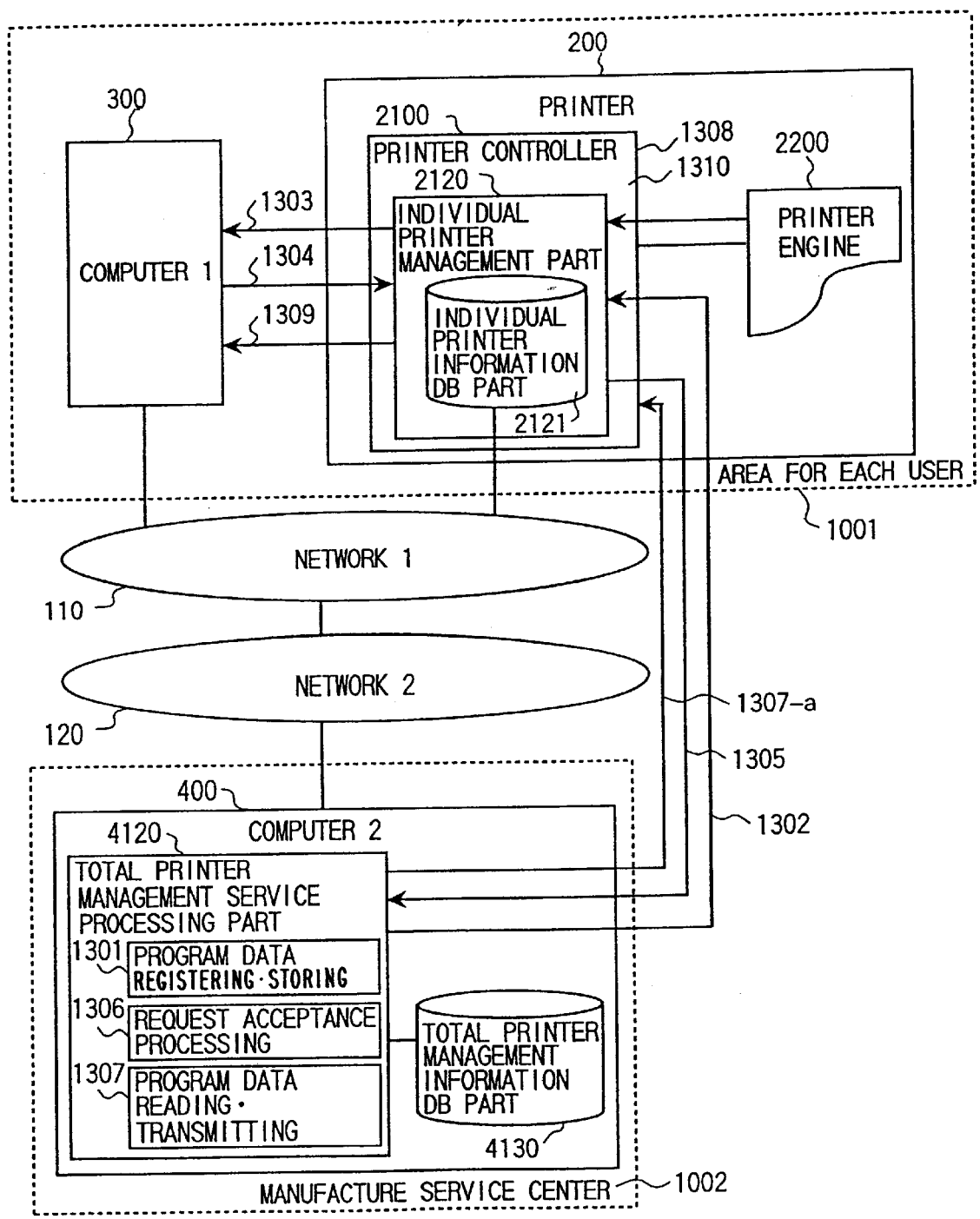
FIG. 13 is a block diagram for explaining a fourth embodiment of a processing procedure in accordance with the present invention.

Then, the total printer management service processing part 4120 in the second computer 400 performs processing for accepting the request by making access to the total printer management information DB part 4130 to write the order in the total printer management information DB part 4130 (process 1306). Then, the total printer management service processing part 4120 reads out the requested programs and the requested data from a printer program/data part 4160 using a printer program/data management part 4150 of FIG. 14, and transmits the requested programs and the requested data to the printer controller 2100 (process 1307). In FIG. 13, the reference character 1307-a indicates the requested programs and the requested data to be transmitted.

The printer controller 2100 in the printer 200 receives and stores the programs and data (process 1308). Then, the printer controller 2100 transmits information on completion of the updating of the programs and the data in the process 1308 and the accompanying information to the computer 300 (process 1309). The first computer 300 displays the information on the completion of the updating of the programs and the data and the accompanying information on a screen of the display using the user interface to notify the user requesting the updating. The user of the first computer having been informed of the completion of the updating by the information on the screen of the display transmits a document to the printer 200 in order to perform printing using the updated programs and the updated data. The printer 200, having been instructed to print, performs printing of the document using the updated programs and the updated data in the printer controller 2100 (process 1310).

A method of storing the updated programs and the updated data in the system and a method of using the updated programs and the updated data will now be described, referring to FIG. 14, FIG. 2, FIG. 3, FIG. 5, and FIG. 6.

Figure 14:
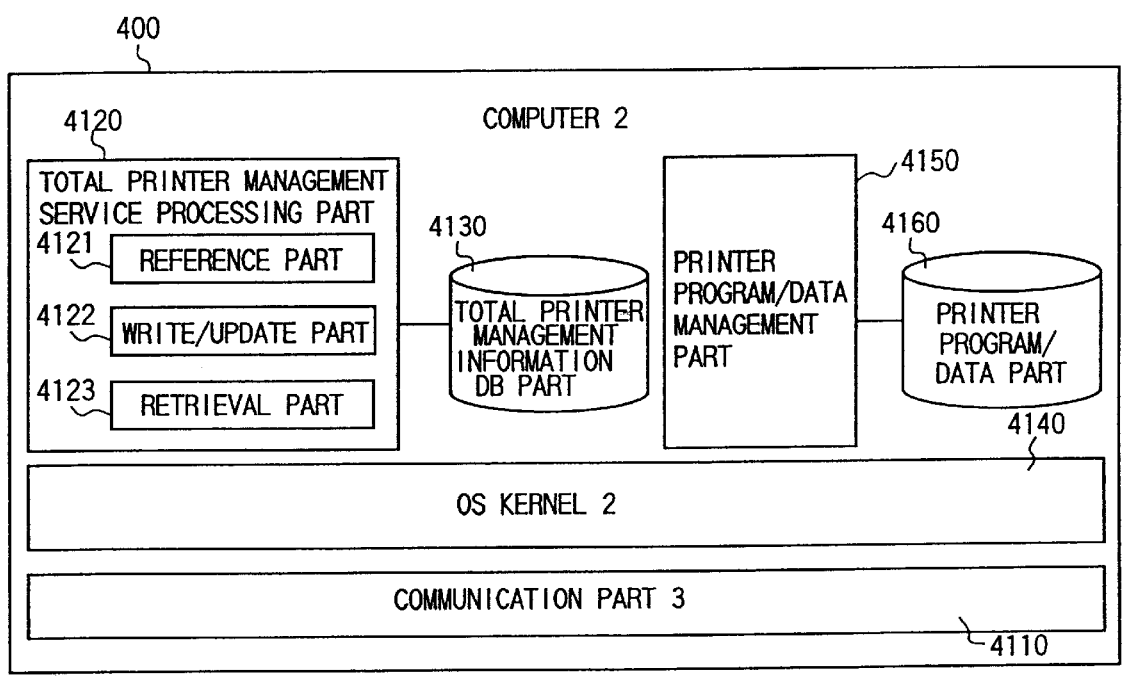
FIG. 14 is a block diagram for explaining a software method of a second computer in accordance with the present invention.

As shown in FIG. 14, the printer manufacturer stores printer programs and data for all printers which it sells in the second computer 400. Here, programs and data for printer controllers are stored. More specifically, the programs and the data for printer controllers are stored in the printer program/data part 4160 and are managed by the printer program/data management part 4150.

Figure 5:
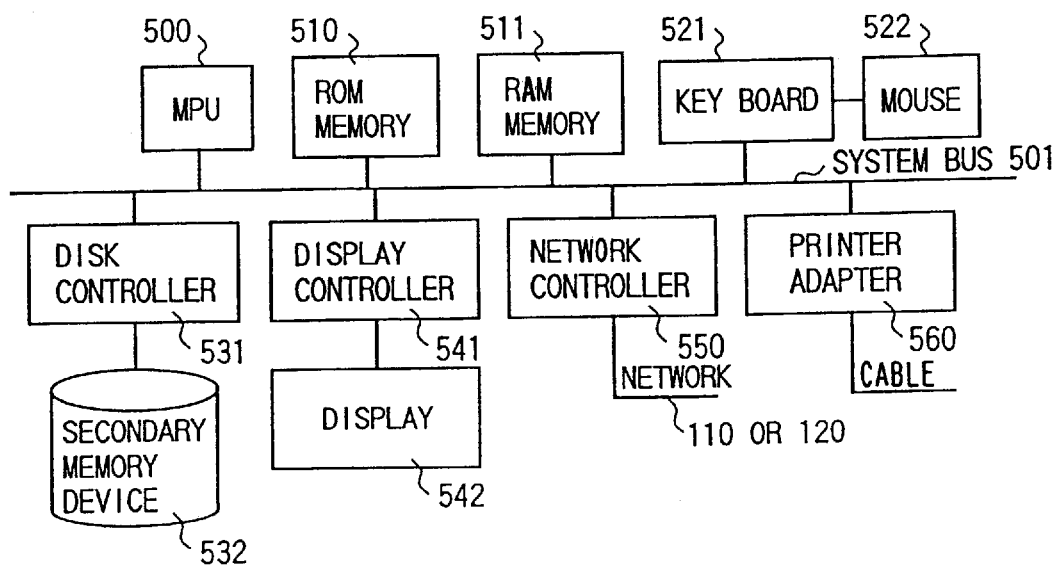
FIG. 5 is a block diagram showing the hardware construction of the first computer and the second computer in accordance with the present invention.

The printer program/data part 4160 is installed in the secondary memory device 532 of FIG. 5. The printer program/data management part 4150 in the second computer 400 is stored in the secondary memory device 532 as a program and is read out to the RAM memory 511 to be executed.

Figure 6:
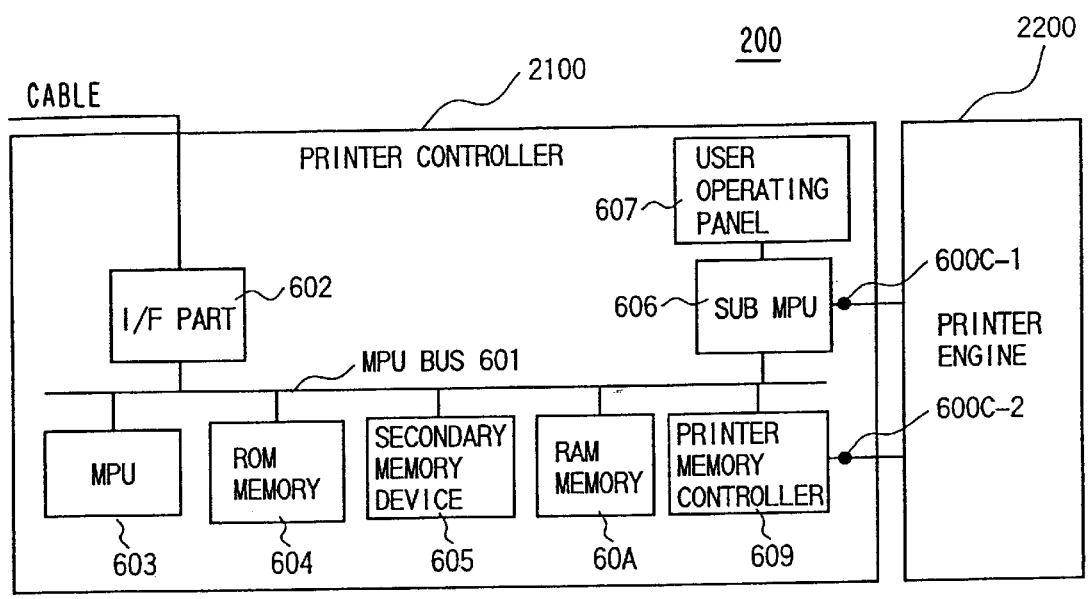
FIG. 6 is a block diagram showing the hardware construction of a printer in accordance with the present invention.

Referring to FIG. 6, the programs and the data for the printer controller 2100 are stored in the secondary memory device 605 in the process 1308. Then, the programs and the data for the printer controller 2100 are read out from the secondary memory device 605 to the RAM memory 60A at the time of initializing the printer controller 2100 and are used. The programs and the data read out to the RAM memory 60A are placed in each of the processing part of the spool control part 2130, the print processing part 2140, the engine control part 2150, the first communication part 2110, and the individual printer management part 2120 of FIG. 2 so as to be executed.

The programs and the data read out to the RAM memory 511 are stored in the print processing part 2140 (particularly in the drawing part 2141) to be used.

The same result can be obtained even if the above embodiment is changed as follows. Although the second computer 400 proposes the updating of the programs and the data to the user of the first computer 300 through the printer controller 2100 in the fourth embodiment, it is possible for the second computer 400 to propose the updating of the programs and the data directly to the user of the first computer 300.

According to the fourth embodiment, there are the following effects.

(1) Updating of the programs and the data are performed through the network. Therefore, it is not necessary for the printer manufacturer to prepare media, such as floppy disks, CD-ROMs, magnetic tapes, and the like, which are necessary in the conventional system. Further, the printer manufacturer does not need to bear the transportation cost of the media, as is required in the conventional system.

(2) The proposal for updating the programs and the data can be transmitted from the printer manufacturer to the printer user by network communication without using mail or facsimile, which is different from the conventional system. Therefore, the mailing cost and facsimile cost (cost for paper and so on) can be substantially reduced.

A fifth embodiment of the processing procedure according to the invention will now be described, referring to FIG. 15 and FIG. 2, FIG. 3, FIG. 5, and FIG. 14.

It is assumed that the printer manufacturer has updated programs and data for using the printer 200 in the first computer 300. The programs are utility programs for using the printer 200, and examples of the utility programs are a printer logic driver for basic software and a printer logic driver for the personal computer. The printer logic driver is sometimes referred to simply as a printer driver, and corresponds to the part indicated by the reference character 3130 in FIG. 3. Other examples of the utility programs are (a) a print command converting program, (b) a spool control instruction program, and (c) a printer management reference/instruction program. The programs (a), (b), and (c) correspond to the parts respectively indicated by the reference characters 3140, 3150, and 3160 in FIG. 3. Examples of the data are font data, a solid black pattern, and a line pattern which are installed in the first computer 300 and used in the printer 200.

Thus, the printer manufacturer registers and stores updated programs and updated data for the first computer 300 in the second computer 400, which manages all the printers of the manufacturer (process 1501).

Then, the second computer 400 transmits information for proposing updating of the programs and the data for the first computer 300 to the printer controller 2100 (process 1502). The information includes an explanation of the contents of the updating and a recommendation for accepting the updating, and a method of requesting the updating. Then, the printer controller 2100 transmits the contents of the proposal to the first computer 300 (process 1503).

Then, the first computer 300 transmits information concerning the request for updating to the printer controller 2100 in order to request updating of the programs and the data for the first computer 300 (process 1504). The request is made at the time when the user of the first computer 300 finds the information on updating corresponding to the information of the process 1503 on a screen of the first computer 300 or the like. Then, the printer controller 2100 forwards the contents of the request to the second computer 400 (process 1505).

Figure 15:
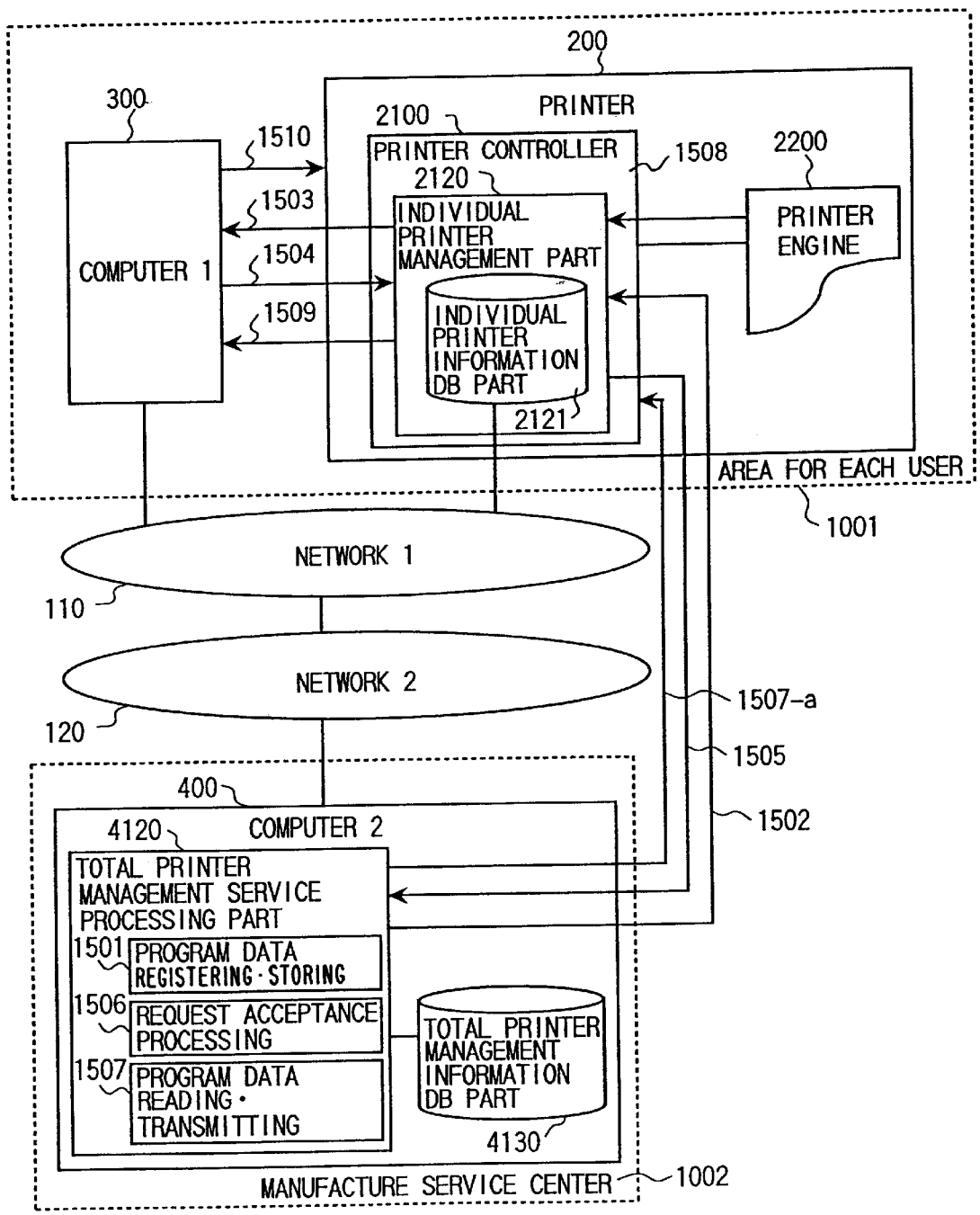
FIG. 15 is a block diagram for explaining a fifth embodiment of a processing procedure in accordance with the present invention.

Then, the total printer management service processing part 4120 in the second computer 400 performs processing for accepting the request by making access to the total printer management information DB part 4130 to write the order in the total printer management information DB part 4130 (process 1506). Then, the total printer management service processing part 4120 reads out the requested programs and the requested data from a printer program/data part 4160 using the printer program/data management part 4150 of FIG. 14, and transmits the requested programs and the requested data to the printer controller 2100 (process 1507). In FIG. 15, the reference character 1507-*a* indicates the requested programs and the requested data to be transmitted.

The printer controller 2100 in the printer 200 receives and stores the programs and the data, and transmits the programs and the data to the first computer 300 (process 1508). Then, the first computer 300 receives the programs and the data for the first computer, and updates and stores the programs and the data in the secondary memory device (process 1509).

The first computer 300 displays the information on the completion of updating of the programs and the data and the accompanying information on a screen of the display using the user interface to notify the user requesting the updating. The user of the first computer, having been informed of the completion of the updating by the information on the screen of the display, instructs the printer 200 to perform printing using the updated programs and the updated data (process 1510).

A method of storing the updated programs and the updated data in the system and a method of using the updated programs and the updated data will now be described, referring to FIG. 14, FIG. 2, FIG. 3, and FIG. 5.

As described previously with reference to FIG. 14, the printer manufacturer stores printer programs and data for all printers which it sells in the second computer 400. Here, programs and data for the first computer 300 are stored. More specifically, the programs and the data for printer controllers are stored in the printer program/data part 4160 and are managed by the printer program/data management part 4150.

The functions of the printer program/data part 4160 and the printer program/data management part 4150 in the second computer 400 are the same as in the case of the fourth embodiment. The updated programs and the updated data for the first computer are stored in the secondary memory device 532 of FIG. 5 in the process 1509. Then, the programs and the data for the first computer 300 are read out from the secondary memory device 532 to the RAM memory 511 at the time of initializing the first computer 300 and are used. The programs and the data read out to the RAM memory 511 are placed in each of the processing part of the printer logic driver part 3130, the spool control instruction part 3150, and the printer management reference/instruction part 3160 of FIG. 3 to be executed. The programs and the data read out to the RAM memory 511 are stored in the first OS kernel part 3120, the printer logic driver part 3130, and the application program part 3140 to be used.

The same result can be obtained even if the above embodiment is changed as follows.

Although the second computer 400 proposes the updating of the programs and the data to the user of the first computer 300 through the printer controller 2100 in the fifth embodiment, it is possible for the second computer 400 to propose the updating of the programs and the data directly to the user of the first computer 300.

According to the fifth embodiment, there are the following effects.

(1) Updating of the programs and the data is performed through the network. Therefore, it is not necessary for the printer manufacturer to prepare media, such as floppy disks, CD-ROMs, magnetic tapes, and the like, which are necessary in the conventional system. Further, the printer manufacturer does not need to bear the transportation cost of the media, as is required in the conventional system.

(2) The proposal for updating the programs and the data can be transmitted from the printer manufacturer to the printer user by network communication without using mail or facsimile, which is different from the conventional system. Therefore, the mailing cost and facsimile cost (cost for paper and so on) can be substantially reduced.

A sixth embodiment of the processing procedure according to the invention will now be described, referring to FIG. 16 and FIG. 2, FIG. 3, FIG. 5, and FIG. 14.

Similarly to the fifth embodiment, this embodiment is used for updating programs and data for using the printer with the first computer 300.

However, in this embodiment, the first computer 300 receives the programs and the data directly from the second computer 400, not through the printer 200. The contents of the programs and the data for the first computer 300 to be updated are the same as those in the fifth embodiment.

Figure 16:
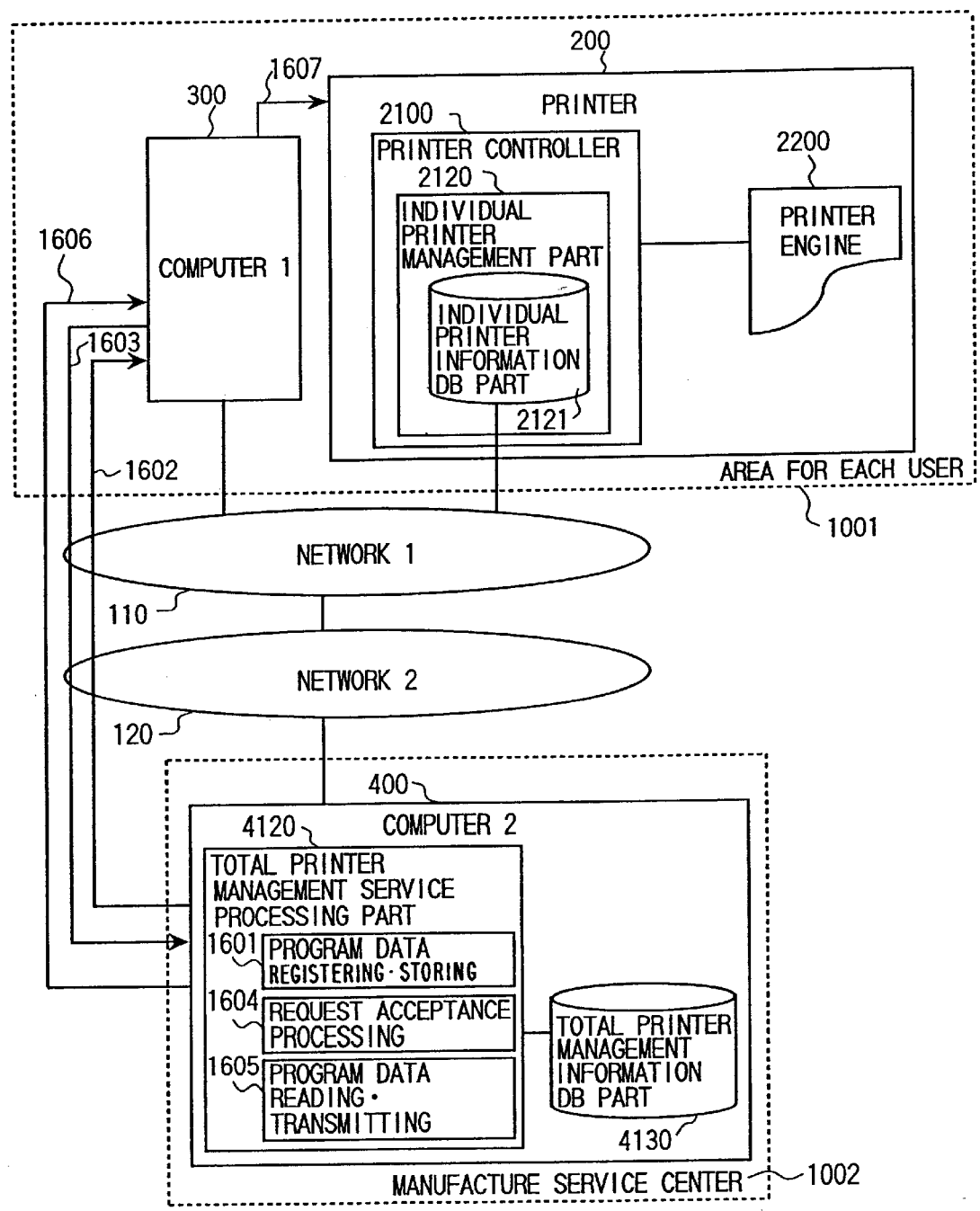
FIG. 16 is a block diagram for explaining a sixth embodiment of a processing procedure in accordance with the present invention.

The processing procedure in the sixth embodiment will now be described, referring to FIG. 16.

The printer manufacturer registers and stores updated programs and updated data for the first computer 300 in the second computer 400 which manages all the printers of the manufacturer (process 1601). Then, the second computer 400 transmits information for proposing updating of the programs and the data for the first computer 300 to the first computer 300 (process 1602). The information includes an explanation of the contents of the updating and a recommendation for acceptance of the updating, and a method of requesting the updating.

Then, the first computer 300 transmits information concerning the request for updating to the second computer 400 in order to request updating of the programs and the data for the first computer 300 (process 1603). The request is made at the time when the user of the first computer 300 finds the information on updating corresponding to the information of the process 1602 on a screen of the first computer 300 or the like.

Then, the total printer management service processing part 4120 in the second computer 400 performs processing for acceptance of the request by making access to the total printer management information DB part 4130 to write the order in the total printer management information DB part 4130 (process 1604).

Then, the total printer management service processing part 4120 reads out the requested programs and the requested data from a printer program/data part 4160 using the printer program/data management part 4150 of FIG. 14, and transmits the requested programs and the requested data to the first computer 300 (process 1605).

The first computer 300 receives the programs and the data, and updates and stores the programs and the data in the secondary memory device (process 1606). The first computer 300 displays the information concerning the completion of updating of the programs and the data and the accompanying information on a screen of the display using the user interface to notify the user requesting the updating. The user of the first computer, having been informed of the completion of the updating by the information on the screen of the display, instructs the printer 200 to perform printing using the updated programs and the updated data (process 1607).

In FIG. 14, FIG. 2, FIG. 3, and FIG. 5, the method of storing the updated programs and the updated data in the system and the method of using the updated programs and the updated data are the same as in the fifth embodiment.

The sixth embodiment can also attain the same effects as the fifth embodiment.

According to the present invention, when a user wants to know about a method of coping with printer trouble or an advanced method of using a printer, the user can automatically make access to the data base in a service center of the printer manufacturer and obtain a reply to an inquiry concerning the computer only by making an inquiry to the printer at hand through the computer at hand usually used by the user. Therefore, a problem in the conventional technology can be solved and the usability of the printer can be improved.

Further, according to the present invention, even if the user does not understand the status of use of various kinds of consumable articles for a complex printer represented by a laser printer, the printing system automatically understands the status of use of various kinds of consumable articles and the user can place an order based on such information to the service center of the printer manufacturer. Therefore, a problem in the conventional technology can be solved and the usability of the printer can be improved. Since there is no need to dispatch a service man dedicated to servicing the printer from the printer manufacturer to the place of the user, it is possible for the user to reduce the maintenance cost, and for the printer manufacture to reduce its personnel expenses.

Furthermore, according to the present invention, even if the user does not understand the status of use and operating status of various kinds of replaceable parts for a complex printer represented by a laser printer, the printing system automatically understands the status of such parts and can place an order to the service center of the printer manufacturer based on such information. Therefore, a problem in the conventional technology can be solved and the usability of the printer can be improved. Since there is no need to dispatch a service man dedicated to servicing the printer from the printer manufacturer to the place of the user, it is possible for the user to reduce the maintenance cost, and for the printer manufacture to reduce its personnel expenses.

What is claimed is:

1. A printing system comprising:

a network;

a first computer connected to the network;

a second computer connected to the network; and a printer connected to the network;

wherein the first computer instructs the printer to print;

wherein the printer includes a printer controller and a printer engine;

wherein the printer controller includes an individual printer management part for managing the printer, and an individual printer information DB part;

wherein the second computer includes a total printer management service processing part for managing a plurality of printers including the printer connected to the network, and a total printer management information DB part;

wherein the printer controller receives from the printer engine information on an occurrence of trouble in the printer engine and an identification of the trouble, and forwards to the first computer the information on the occurrence of trouble in the printer engine and the identification of the trouble;

wherein the first computer transmits an inquiry concerning a method of coping with the trouble to the printer controller, and the printer controller transmits the inquiry to the second computer;

wherein the total printer management service processing part of the second computer obtains a reply to the inquiry from the total printer management information DB part, and then transmits the reply to the printer controller; and wherein the printer controller transmits the reply to the first computer.

2. A printing system comprising:

a network;

a first computer connected to the network;

a second computer connected to the network; and a printer connected to the network;

wherein the first computer instructs the printer to print;

wherein the printer includes a printer controller and a printer engine;

wherein the printer controller includes an individual printer management part for managing the printer, and an individual printer information DB part;

wherein the second computer includes a total printer management service processing part for managing a plurality of printers including the printer connected to the network, and a total printer management information DB part;

wherein the printer controller receives from the printer engine information on a consumed status of consumable articles in the printer engine, and stores the consumed status information in the individual printer information DB part;

wherein, based on the consumed status information stored in the individual printer information DB part, the first computer obtains information indicating a shortage of consumable articles in the printer engine from the printer controller;

wherein the first computer transmits an order for consumable articles for which there is a shortage to the printer controller, and the printer controller transmits the order to the second computer;

wherein the total printer management service processing part of the second computer performs acceptance processing of the order by writing order information in the total printer management information DB part, and then transmits information on completion of reception of the order and accompanying information to the printer controller; and wherein the printer controller transmits the information on completion of reception of the order and the accompanying information to the first computer.

3. A printing system comprising:

a network;

a first computer connected to the network;

a second computer connected to the network; and a printer connected to the network;

wherein the first computer instructs the printer to print;

wherein the printer includes a printer controller and a printer engine;

wherein the printer controller includes an individual printer management part for managing the printer, and an individual printer information DB part;

wherein the second computer includes a total printer management service processing part for managing a plurality of printers including the printer connected to the network, and a total printer management information DB part;

wherein the printer controller receives information from the printer engine on an operating status of the printer engine, and stores the operating status information in the individual printer information DB part;

wherein, based on the operating status information stored in the individual printer information DB part of the printer controller, the total printer management service processing part of the second computer collects information on the operating status of the printer engine;

wherein, based on the collected operating status information, the total printer management service processing part in the second computer sends a proposal for replacing a part of the printer engine to the printer controller;

wherein the printer controller transmits the part replacement proposal to the first computer;

wherein, based on the part replacement proposal, the first computer transmits an order for a part of the printer engine to be replaced to the printer controller;

wherein the printer controller transmits the order to the second computer; and wherein, in response to the order, the total printer management service processing part of the second computer performs acceptance processing of the order.

4. A printing system according to claim 3, wherein after the total printer management service processing part of the second computer performs the acceptance processing of the order, the total printer management service processing part of the second computer transmits information on completion of acceptance of the order and accompanying information to the printer controller; and wherein the printer controller transmits the information on completion of acceptance of the order and the accompanying information to the first computer.

5. A printing system comprising:

a network;

a first computer connected to the network;

a second computer connected to the network; and a printer connected to the network;

wherein the first computer instructs the printer to print;

wherein the printer includes a printer controller and a printer engine;

wherein an updated program and updated data for the printer controller are registered and stored in the second computer;

wherein the second computer transmits a proposal for updating a program and data for the printer controller to the printer controller;

wherein the printer controller transmits the updating proposal to the first computer;

wherein the first computer transmits an updating request requesting updating of the program and the data for the printer controller to the printer controller;

wherein the printer controller transmits the updating request to the second computer;

wherein the second computer reads the updated program and the updated data stored in the second computer in response to the updating request, and then transmits the updated program and the updated data to the printer controller;

wherein the printer controller stores the updated program and the updated data;

wherein the printer controller transmits information on completion of updating of the program and the data to the first computer;

wherein the first computer notifies a user of the first computer of the completion of updating by displaying updating completion information on a screen using a user interface;

wherein the user of the first computer, having been notified of the completion of updating by the updating completion information, instructs the first computer to transmit a document to the printer; and wherein the printer prints the document using the updated program and the updated data.

6. A printing system comprising:

a network;

a first computer connected to the network;

a second computer connected to the network; and a printer connected to the network;

wherein the first computer instructs the printer to print;
wherein the printer includes a printer controller and a printer engine;

wherein an updated program and updated data for the first computer are registered and stored in the second computer;

wherein the second computer transmits a proposal for updating a program and data for the first computer to the printer controller;

wherein the printer controller transmits the updating proposal to the first computer;

wherein the first computer transmits an updating request requesting updating of the program and the data for the first computer to the printer controller;

wherein the printer controller transmits the updating request to the second computer;

wherein the second computer reads the updated program and the updated data stored in the second computer in response to the updating request, and then transmits the updated program and the updated data to the printer controller;

wherein the printer controller stores the updated program and the updated data, and then transmits the updated program and the updated data to the first computer;

wherein the first computer stores the updated program and the updated data;

wherein the first computer notifies a user of the first computer of completion of updating by displaying updating completion information on a screen using a user interface; and wherein the user of the first computer, having been notified of the completion of updating by the updating completion information, instructs the printer to print using the updated program and the updated data.

7. A printing system comprising:

a network;

a first computer connected to the network;

a second computer connected to the network; and a printer connected to the network;

wherein the first computer instructs the printer to print;

wherein the printer includes a printer controller and a printer engine;

wherein an updated program and updated data for the first computer are registered and stored in the second computer;

wherein the second computer transmits a proposal for updating a program and data for the first computer to the first computer;

wherein the first computer transmits an updating request requesting updating of the program and the data for the first computer to the second computer;

wherein the second computer reads the updated program and the updated data stored in the second computer in response to the updating request, and then transmits the updated program and the updated data to the first computer;

wherein the first computer stores the updated program and the updated data;

wherein the first computer notifies a user of the first computer of completion of updating by displaying updating completion information on a screen using a user interface; and wherein the user of the first computer, having been notified of the completion of updating by the updating completion information, instructs the printer to print using the updated program and the updated data.

* * * * *